United States Patent
Gao et al.

(10) Patent No.: US 10,755,079 B2
(45) Date of Patent: Aug. 25, 2020

(54) METHOD AND APPARATUS FOR ACQUIRING FACIAL INFORMATION

(71) Applicant: Baidu Online Network Technology (Beijing) Co., Ltd., Beijing (CN)

(72) Inventors: Leilei Gao, Beijing (CN); Shuhan Luan, Beijing (CN); Zhike Zhang, Beijing (CN); Fei Wang, Beijing (CN); Jing Li, Beijing (CN); Xiangtao Jiang, Beijing (CN); Yue Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 218 days.

(21) Appl. No.: 15/856,983

(22) Filed: Dec. 28, 2017

(65) Prior Publication Data
US 2019/0147222 A1  May 16, 2019

(30) Foreign Application Priority Data
Nov. 16, 2017 (CN) .......................... 2017 1 1137585

(51) Int. Cl.
*G06K 9/00* (2006.01)
*G10L 15/22* (2006.01)
(Continued)

(52) U.S. Cl.
CPC ....... *G06K 9/00228* (2013.01); *G06F 16/583* (2019.01); *G06K 9/00288* (2013.01);
(Continued)

(58) Field of Classification Search
CPC ............ G06K 9/00228; G06K 9/00288; G06F 16/583; G10L 15/1815; G10L 15/22; G10L 2015/088; G10L 2015/223
(Continued)

(56) References Cited

U.S. PATENT DOCUMENTS 7,787,697 B2 *  8/2010  Ritzau .................... G06K 9/228
                                                    382/115
7,848,549 B2 * 12/2010  Steinberg ........... H04N 5/23212
                                                    382/103
(Continued)

FOREIGN PATENT DOCUMENTS

JP   2003076990 A   3/2003
JP   2006165822 A   6/2006

*Primary Examiner* — Jonathan S Lee
(74) *Attorney, Agent, or Firm* — Seed IP Law Group LLP

(57) ABSTRACT

Embodiments of the present disclosure disclose a method and apparatus for acquiring facial information. A specific embodiment of the method comprises: acquiring to-be-processed voice information and a to-be-processed image, and performing voice recognition on the to-be-processed voice information to acquire query information, the to-be-processed image comprising a plurality of facial images, and the query information being used to instruct querying facial information of a specified facial image in the to-be-processed image; recognizing semantically the query information to acquire a keyword set for querying the facial information; processing the to-be-processed image to acquire facial information in the to-be-processed image; and acquiring facial information corresponding to the to-be-processed voice information from the facial information by using the keyword set. The present embodiment realizes recognition on a plurality of facial images contained in a to-be-processed image and determines facial information by using a keyword, thereby improving the accuracy of acquiring a facial image by means of voice.

11 Claims, 5 Drawing Sheets

(51) Int. Cl.
*G10L 15/18* (2013.01)
*G06F 16/583* (2019.01)
*G10L 15/08* (2006.01)

(52) U.S. Cl.
CPC .......... *G10L 15/1815* (2013.01); *G10L 15/22* (2013.01); *G10L 2015/088* (2013.01); *G10L 2015/223* (2013.01); *G10L 2015/226* (2013.01)

(58) Field of Classification Search
USPC ...................................................... 382/116
See application file for complete search history.

(56) References Cited

U.S. PATENT DOCUMENTS

| | | | |
|---|---|---|---|
| 2008/0152197 A1* | 6/2008 | Kawada | H04N 1/2112 382/115 |
| 2009/0122198 A1* | 5/2009 | Thorn | G06K 9/00221 348/715 |
| 2012/0051658 A1* | 3/2012 | Tong | G11B 27/034 382/224 |
| 2014/0108501 A1* | 4/2014 | Papakipos | G06F 16/583 709/203 |
| 2015/0269420 A1 | 9/2015 | Kim et al. | |

* cited by examiner

METHOD AND APPARATUS FOR ACQUIRING FACIAL INFORMATION

CROSS-REFERENCE TO RELATED APPLICATION

This application is related to and claims priority from Chinese Application No. 201711137585.1, filed on Nov. 16, 2017 and entitled "Method and Apparatus for acquiring facial information", the entire disclosure of which is hereby incorporated by reference.

TECHNICAL FIELD

Embodiments of the present disclosure relate to the field of data processing technology, in particular to the field of voice recognition technology, especially to a method and apparatus for acquiring facial information.

BACKGROUND

With the development of artificial intelligence and the continuous improvement of the voice recognition technology, data processing by voice becomes more and more intelligent. People may use voice to complete the data processing that needed to be done by hand in the past, which provides more ways for people to acquire information, and improves the efficiency of people in acquiring information. For example, a user may instruct a terminal to query a facial information in a displayed image by sending a voice information to the terminal, and the terminal returns facial information of a facial image in the image according to the voice information, thereby acquiring facial information in an image by voice.

SUMMARY

A purpose of an embodiment of the present disclosure is to propose a method and apparatus for acquiring facial information.

In a first aspect, an embodiment of the present disclosure provides a method for acquiring facial information, the method comprising: acquiring to-be-processed voice information and a to-be-processed image, and performing voice recognition on the to-be-processed voice information to acquire query information, the to-be-processed image comprising a plurality of facial images, and the query information being used to instruct querying facial information of a specified facial image in the to-be-processed image; recognizing semantically the query information to acquire a keyword set for querying the facial information; processing the to-be-processed image to acquire facial information in the to-be-processed image; and acquiring facial information corresponding to the to-be-processed voice information from the facial information by using the keyword set.

In some embodiments, the recognizing semantically the query information to acquire a keyword set for querying the facial information comprises: semantically recognizing the query information to acquire semantically recognized information, and dividing the semantically recognized information into phrases to acquire a phrase set comprising at least one phrase; and selecting at least one keyword from the phrase set for determining a facial image in the to-be-processed image, and combining the at least one keyword into a keyword set, the keyword including a position keyword.

In some embodiments, the processing the to-be-processed image to acquire a facial information in the to-be-processed image comprises: performing facial recognition on the to-be-processed image, and determining each facial image in the to-be-processed image; and querying personal information corresponding to the each facial image, and assigning the personal information as facial information corresponding to the facial image, the personal information comprising a name and a gender.

In some embodiments, the processing the to-be-processed image to acquire facial information in the to-be-processed image comprises: scanning the to-be-processed image to acquire coordinate information of the each facial image in the to-be-processed image.

In some embodiments, the acquiring facial information corresponding to the to-be-processed voice information from the facial information through the keyword set comprises: setting position information of each facial image in the to-be-processed image according to the coordinate information of the each facial image; determining target position information of a facial image corresponding to the query information in the to-be-processed image through a keyword in the keyword set; and assigning the facial image corresponding to the target position information as a target facial image corresponding to the to-be-processed voice image, and acquiring facial information of the target facial image.

In some embodiments, the setting position information of each facial image in the to-be-processed image according to the coordinate information of the each facial image comprises: dividing the to-be-processed image into a grid having m rows and n columns according to the coordinate information of each facial image, the facial image in each element of the grid being not more than one; and setting a row number and/or a column number of each element of the grid where the each facial image is as position information of the facial image.

In some embodiment, the method further comprises: displaying the target facial image, the displaying the target facial image comprising: displaying, in the each facial image in the to-be-processed image position, information corresponding to the each facial image; and highlighting, in response to selection information of a user selecting position information of the target facial image, the target facial image corresponding to the position information as indicated by the selection information in the to-be-processed image.

In some embodiments, the method further comprises: displaying and/or playing, in response to determination information of the user determining the target facial image, facial information of the target facial image as indicated by the determination information.

In a second aspect, an embodiment of the present disclosure provides an apparatus for acquiring facial information, the apparatus comprising: an information acquisition unit, configured for acquiring to-be-processed voice information and a to-be-processed image, and performing voice recognition on the to-be-processed voice information to acquire query information, the to-be-processed image comprising a plurality of facial images, and the query information being used to instruct querying facial information of a specified facial image in the to-be-processed image; a keyword acquisition unit, configured for recognizing semantically the query information to acquire a keyword set for querying the facial information; a facial information generation unit, configured for processing the to-be-processed image to acquire facial information in the to-be-processed image; and a facial information acquisition unit, configured for acquiring facial information corresponding to the to-be-processed voice information from the facial information by using the keyword set.

In some embodiments, the keyword acquisition unit comprises: a phrase set acquisition subunit, configured for semantically recognizing the query information to acquire semantically recognized information, and dividing the semantically recognized information into phrases to acquire a phrase set comprising at least one phrase; and a keyword acquisition subunit, configured for selecting at least one keyword from the phrase set for determining a facial image in the to-be-processed image, and combining the at least one keyword into a keyword set, the keyword including a position keyword.

In some embodiments, the facial information generation unit comprises: a facial recognition subunit, configured for performing facial recognition on the to-be-processed image, and determining each facial image in the to-be-processed image; and a facial information generation subunit, configured for querying personal information corresponding to the each facial image, and assigning the personal information as facial information corresponding to the facial image, the personal information comprising a name and a gender.

In some embodiments, the facial information generation unit is further configured for: scanning the to-be-processed image to acquire coordinate information of the each facial image in the to-be-processed image.

In some embodiments, the facial information acquisition unit comprises: a position information setting subunit, configured for setting position information of each facial image in the to-be-processed image according to the coordinate information of the each facial image; a target position information determination subunit, configured for determining target position information of a facial image corresponding to the query information in the to-be-processed image through a keyword in the keyword set; and a facial information acquisition subunit, configured for assigning the facial image corresponding to the target position information as a target facial image corresponding to the to-be-processed voice image, and acquiring facial information of the target facial image.

In some embodiments, the position information setting subunit comprises: a grid generation module, configured for dividing the to-be-processed image into a grid having m rows and n columns according to the coordinate information of each facial image, the facial image in each element of the grid being not more than one; and a position information setting module, configured for setting a row number and/or a column number of each element of the grid where the each facial image is as position information of the facial image.

In some embodiments, the apparatus further comprises: a display unit, configured for displaying the target facial image, the display unit comprising: a position information display subunit, configured for displaying, in the each facial image in the to-be-processed image position, information corresponding to the each facial image; and a target facial image display subunit, configured for highlighting, in response to selection information of a user selecting position information of the target facial image, the target facial image corresponding to the position information as indicated by the selection information in the to-be-processed image.

In some embodiment, the apparatus further comprises: a unit configured for displaying and/or playing, in response to determination information of the user determining the target facial image, facial information of the target facial image as indicated by the determination information.

In a third aspect, an embodiment of the present disclosure provides a server, comprising: one or more processors; and a storage, configured for storing one or more programs, the one or more programs, when executed by the one or more processors, cause the one or more processors to execute the method in the first aspect.

In a fourth aspect, an embodiment of the present disclosure provides a computer readable storage medium storing a computer program, wherein the program, when executed by a processor, cause the processor to perform the method in the first aspect.

The facial information acquisition method and apparatus provided by an embodiment of the present disclosure realize recognition on a plurality of facial images contained in a to-be-processed image by: firstly, acquiring a to-be-processed voice information and a to-be-processed image, and acquiring a query information corresponding to the to-be-processed voice information, the to-be-processed image comprising a plurality of facial images; and then, semantically recognizing the received query information to acquire a keyword set for querying a facial information, and positioning a facial image in the to-be-processed image by using a keyword; then, processing the to-be-processed image to acquire a facial information in the to-be-processed image; lastly, acquiring a facial information corresponding to the to-be-processed voice information from the facial information by using the keyword set. In addition, such method and apparatus determine a facial information by using a keyword, thereby improving the accuracy of acquiring a facial image by means of voice.

BRIEF DESCRIPTION OF THE DRAWINGS

Other features, objects and advantages of the present disclosure will become more apparent by reading the detailed description about the non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
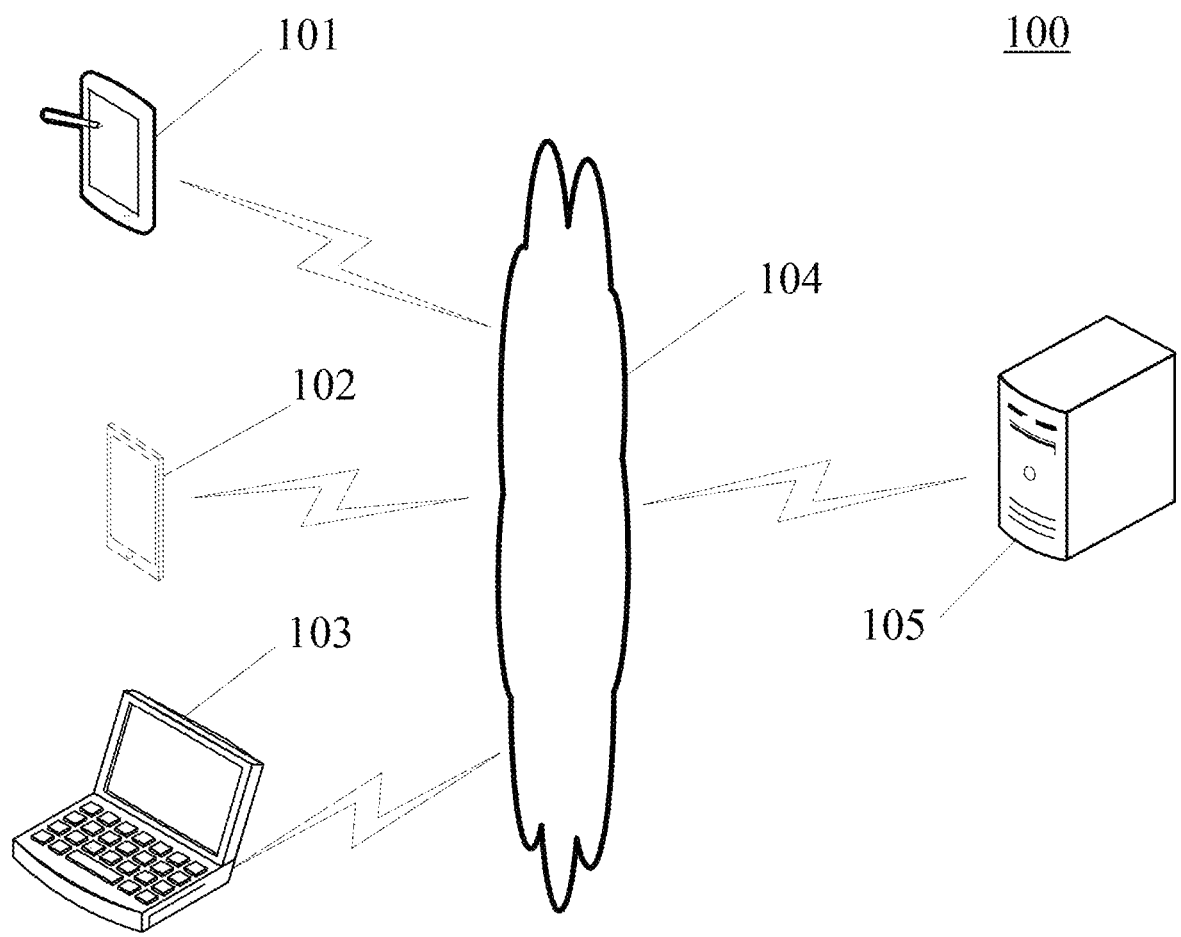
FIG. 1 is an exemplary system architecture to which the present disclosure may be applied.

FIG. 1 shows an exemplary architecture of a system 100 which may be used by a method or apparatus for acquiring facial information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

A user may use the terminal devices 101, 102 and 103 to interact with the server 105 through the network 104, in order to transmit or receive messages, etc. Various data processing applications, such as picture browsering applications, audio processing applications, search applications, voice recognizing applications, and image processing applications may be installed on the terminal devices 101, 102 and 103.

The terminal devices 101, 102 and 103 may be various electronic devices having a display and supporting the image display, including but not limited to, smart phones, tablet computers, laptop computers and desktop computers.

The server 105 may be a server providing various services, for example, a server querying the facial image sent from the terminal device 101, 102 or 103. The server may query the received facial image to obtain personal information corresponding to the facial image and feed the personal information back to the terminal device.

It should be noted that a facial information acquisition method as provided in an embodiment of the present disclosure is generally executed by terminal devices 101, 102 and 103. Correspondingly, a facial information acquisition apparatus is generally provided in the terminal devices 101,102 and 103.

It should be understood that the numbers of terminal devices, networks, and servers in FIG. 1 are merely illustrative. There may be any number of terminal devices, networks and servers, depending on the implementation needs.

Figure 2:
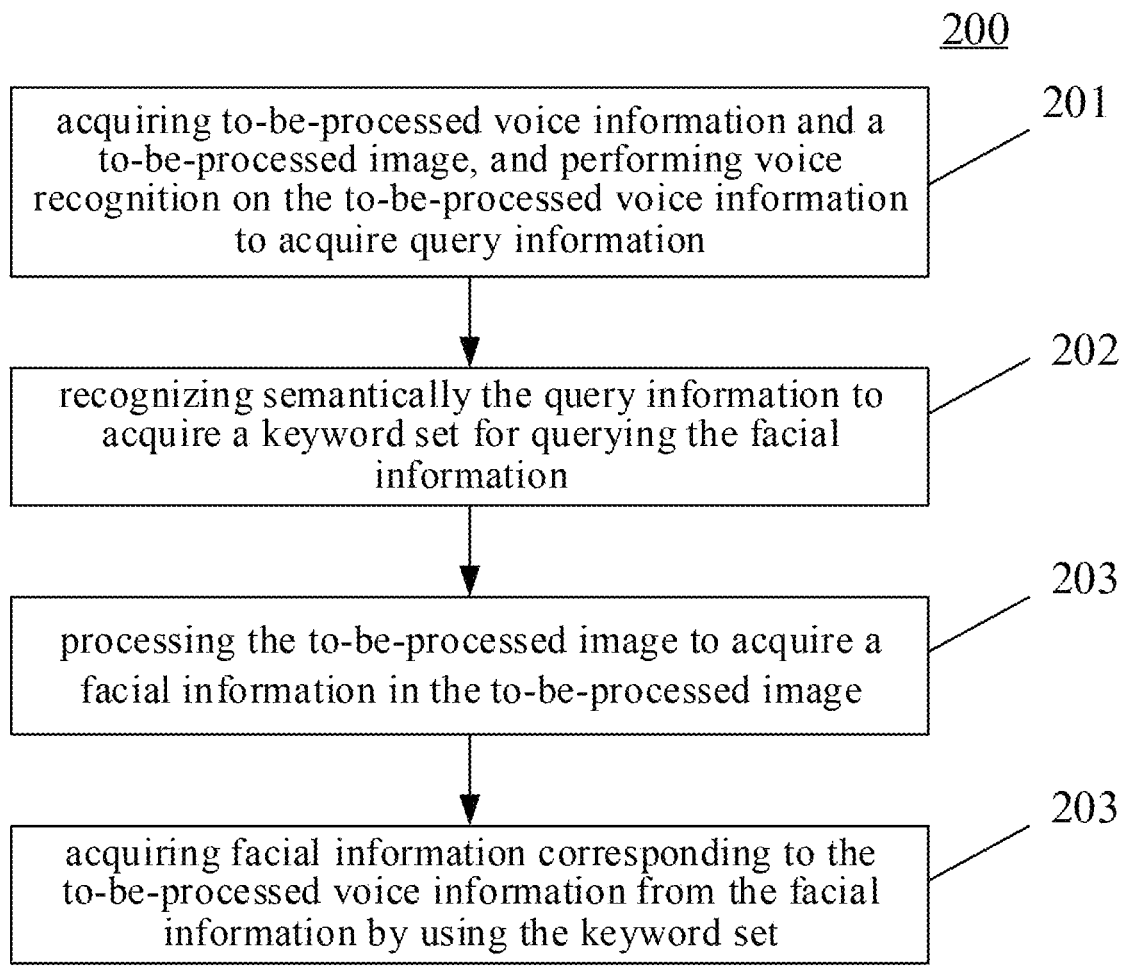
FIG. 2 is a flowchart of an embodiment of a facial information acquisition method according to the present disclosure.

Referring further to FIG. 2, a flow 200 of one embodiment of a facial information acquisition method according to the present disclosure is shown. The facial information acquisition method comprises the following steps:

Step 201: acquiring to-be-processed voice information and a to-be-processed image, and performing voice recognition on the to-be-processed voice information to acquire query information.

In the present embodiment, an electronic device (for example, the terminal devices 101, 102 and 103 shown in FIG. 1) to which the facial information acquisition method is applied may use a wired connection or a wireless connection means to receive a web browsing request from a terminal used by a user for web browsing. It should be noted that the wireless connection means may comprise but not limited to a 3G/4G connection, a WiFi connection, a Bluetooth connection, a WiMAX connection, a Zigbee connection, a UWB (ultra wideband) connection and other wireless connection means that is known now or is to be developed in future.

When a facial information in an image is acquired by voice in the prior art, a terminal first converts the voice into a text message, and then determines whether the text message has an intention of recognizing a face, and, if yes, the terminal returns a facial information of a facial image in the image. Although a facial information in an image may be acquired by voice in the prior art, it is often impossible to determine a facial information of a specific facial image where there are a plurality of facial images in the image. Therefore, when there are a plurality of facial images in an image, it is often impossible to acquire an accurate facial information by voice with the existing method.

In order to solve the problems in the prior art, when a user acquires a facial information in a to-be-processed image by means of a voice information according to the present disclosure, the user may send a to-be-processed voice information to the terminal devices 101, 102 and 103, and the terminal devices 101, 102 and 103 may acquire the to-be-processed voice information and a corresponding to-be-processed image, and perform voice recognition on the to-be-processed voice information to acquire query information. The to-be-processed image comprises a plurality of facial images, and the query information is used to instruct to query a facial information of a specified facial image in the to-be-processed image. For example, when there are a plurality of facial images in a to-be-processed image, a query information corresponding to the to-be-processed voice information may be "Who is the leftmost woman?".

Step 202: recognizing semantically the query information to acquire a keyword set for querying the facial information.

It is required to semantically recognize the acquired query information. Taking the query information "Who is the leftmost woman?" as an example, a message acquired after the semantic recognition on the query information may be "Acquire a facial information of a facial image of the leftmost woman". A keyword relevant to the facial information may be selected from the message, and the keyword is combined into a keyword set.

In some optional implementations of the present embodiment, the recognizing semantically the query information to acquire a keyword set for querying the facial information may comprise the following steps:

Step one, semantically recognizing the query information to acquire semantically recognized information, and dividing the semantically recognized information into phrases to acquire a phrase set comprising at least one phrase.

In order to determine a facial information of a specific facial image in the to-be-processed image as required by a user, the query information is semantically recognized to acquire a semantically recognized information. And then, the semantically recognized information is divided into phrases to acquire a phrase set comprising at least one phrase. Also taking the query information "Who is the leftmost woman?" as an example, a corresponding semantically recognized information may be "Acquire a facial information of a facial image of the leftmost woman". A phrase set obtained by dividing the semantically recognized information into phrases may comprise phrases such as "acquire", "leftmost", "woman", "facial image", "of", "facial information".

Step two: selecting at least one keyword from the phrase set for determining a facial image in the to-be-processed image, and combining the at least one keyword into a keyword set.

It is possible to select at least one keyword for determining a facial image from the acquired phrase set. The keyword comprises a position keyword, or comprises a number keyword or a gender keyword. For example, the position keyword may be "leftmost", "rightmost", "middle position" and the like; the number keyword may be "the first one", "the last one" and the like; and the gender keyword may be "woman" and "man". Taking the phrase set as an example, the phrases "leftmost" and "woman" in the phrase set may be keywords, and the "leftmost" and "woman" are combined as keywords into a keyword set.

Step 203: processing the to-be-processed image to acquire a facial information in the to-be-processed image.

A plurality of facial images are included in a to-be-processed image according to the present disclosure, a facial image may be recognized from the to-be-processed image by processing the to-be-processed image, thereby acquiring a facial information.

In some optional implementations of the present embodiment, the processing the to-be-processed image to acquire a facial information in the to-be-processed image comprises the following steps:

Step one: performing facial recognition on the to-be-processed image, and determine each facial information in the to-be-processed image.

It is possible to recognize a facial image contained in the to-be-processed image by performing data processing on the to-be-processed image by means of facial recognition.

Step two: querying personal information corresponding to the each facial image, and assigning the personal information as facial information corresponding to the facial image.

After a facial image is acquired, a personal information corresponding to the facial image may be queried locally or from a server 105. And then, the personal information is used as a facial information of the facial image. The personal information comprises such as name, gender, title and family members.

In some optional implementations of the present embodiment, the processing the to-be-processed image to acquire a facial information in the to-be-processed image further comprises: scanning the to-be-processed image to acquire coordinate information of the each facial image in the to-be-processed image.

In order to quantitatively determine a position of a facial image in the to-be-processed image, the to-be-processed image may be scanned to acquire a coordinate information of each facial image. Since the facial image usually occupies a certain image area, the coordinate information herein may be composed of coordinate values of a pixel corresponding to the facial image.

Step 204: acquiring facial information corresponding to the to-be-processed voice information from the facial information by using the keyword set.

After the keyword set is acquired, a facial information may be selected by using each keyword in the keyword set so as to acquire a facial information meeting all keywords in the keyword set.

Also taking the keyword set as an example, the keyword set comprises two keywords "leftmost" and "woman". When the to-be-processed image comprises a plurality of facial images, it is possible to first determine all woman facial images in the to-be-processed image according to the two keywords "leftmost" and "woman", and then acquire a facial information of the "leftmost" women facial image in all woman facial images.

In some optional implementations of the present embodiment, the acquiring facial information corresponding to the to-be-processed voice information from the facial information through the keyword set may comprise the following steps:

Step one: setting position information of each facial image in the to-be-processed image according to the coordinate information of the each facial image.

It may be seen from the descriptions above that the coordinate information of the facial image may determine the position of the facial image in the to-be-processed image. However, it is not usually possible for a user to know a coordinate value of a pixel of the facial image in practice. Therefore, the coordinate information may be set as a corresponding position information. The position information may be represented by "upper left", "upper right" and the like, and may also be represented by other forms of information.

Step two: determining target position information of a facial image corresponding to the query information in the to-be-processed image through a keyword in the keyword set.

After a position information of each facial image is determined, a keyword in the keyword set is matched with the position information of the facial image to determine a position information matching the keyword. That is, the facial image corresponding to the position information is the facial image to be searched by the query information, and the position information of the facial image is the target position information.

Step three: assigning the facial image corresponding to the target position information as a target facial image corresponding to the to-be-processed voice image, and acquiring facial information of the target facial image.

After the target position information is determined, the facial image corresponding to the target position information is the target facial image to be searched by the to-be-processed voice image, and the facial information of the target facial image is the facial information to be searched by the to-be-processed voice information.

In some optional implementations of the present embodiment, the setting position information of each facial image in the to-be-processed image according to the coordinate information of the each facial image comprises the following steps:

Step one: dividing the to-be-processed image into a grid having m rows and n columns according to the coordinate information of each facial image.

The coordinate information of the facial image is composed of coordinate values, which is inconvenient for a user to use. The number of facial images contained in the to-be-processed image will not be too large in general. Therefore, the to-be-processed image may be divided into a grid having m rows and n columns in the present embodiment. There are no more than one facial image in each element of the grid. In such a way, a facial image may be positioned by using the grid.

Step two: setting a row number and/or a column number of each element of the grid where the each facial image is as position information of the facial image.

After a grid having m rows and n columns is formed, each element of the grid may have a corresponding row number and a corresponding column number. The row number and/or the column number of an element of the grid may be set as a position information of the facial image according to the actual situation. For example, when a facial image is arranged in a row, the column number of an element of the grid may be used as a position information of the facial image. When a facial image is arranged in a column, the row number of the element of the grid may be used as a position information of the facial image.

In some optional implementations of the present embodiment, the method further comprises a step of displaying the target facial image, and the step of displaying the target facial image may comprise the following steps:

Step one: displaying, in the each facial image in the to-be-processed image position, information corresponding to the each facial image.

After a position information of a facial image is determined, the position information may be displayed in a corresponding facial image so as to facilitate a user to select.

Step two: highlighting, in response to selection information of a user selecting position information of the target facial image, the target facial image corresponding to the position information as indicated by the selection information in the to-be-processed image.

When the user selects a position information of a target facial image, a target facial image corresponding to the position information may be highlighted so that the user may acquire the currently selected target facial image. When the user finds that the current target facial image is not the facial image he/she wants, the user may reselect a target facial image by means of a voice information or a button.

In some optional implementations of the present embodiment, the method may further comprise: displaying and/or playing, in response to determination information of the user determining the target facial image, facial information of the target facial image as indicated by the determination information.

After the currently selected target facial image is highlighted, the user may further determine the target facial image. The terminal devices 101, 102 and 103, when receiving the determination information, may display the facial information of the target facial image by means of a video or an image, and may also play the facial information of the target facial image by means of audio. It should be noted that the method in the present embodiment may acquire a facial information of a target facial image from a plurality of facial images, and may also acquire facial informations of a plurality of facial images at the same time, depending on the actual situation.

Figure 3:
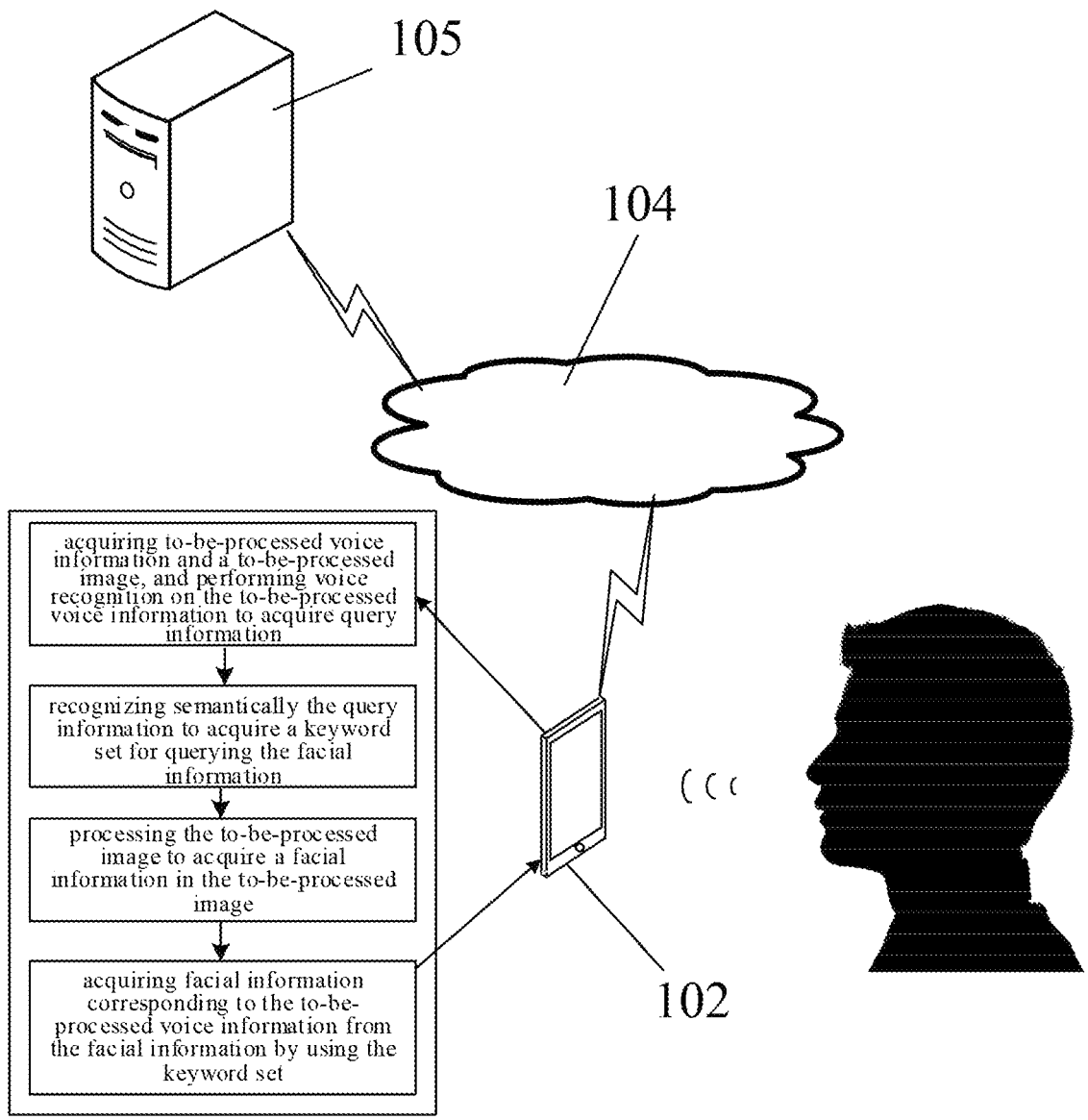
FIG. 3 is a schematic diagram of an application scenario of a facial information acquisition method according to the present disclosure.

Referring further to FIG. 3, FIG. 3 is a schematic diagram of an application scenario of a facial information acquisition method according to the present embodiment. In the application scenario of FIG. 3, when a user is to view a to-be-processed image comprising a plurality of facial images in the terminal device 102, the user sends a to-be-processed voice information to the terminal device 102. The terminal device 102 simultaneously acquires the to-be-processed voice information and the to-be-processed image, and obtains a query information corresponding to the to-be-processed voice information; the terminal device 102 determines a keyword set from the query information; and then, the terminal device 102 processes the to-be-processed image and determines a facial information in the to-be-processed image; and lastly, the terminal device 102 acquire a facial information by using a keyword set.

The facial information acquisition method provided by the embodiments above realizes recognition on a plurality of facial images contained in a to-be-processed image by: firstly, acquiring a to-be-processed voice information and a to-be-processed image, and acquiring a query information corresponding to the to-be-processed voice information, the to-be-processed image comprising a plurality of facial images; and then, semantically recognizing the received query information to acquire a keyword set for querying a facial information, and positioning a facial image in the to-be-processed image by using a keyword; then, processing the to-be-processed image to acquire a facial information in the to-be-processed image; lastly, acquiring a facial information corresponding to the to-be-processed voice information from the facial information by using the keyword set. In addition, such method determines a facial information by using a keyword, thereby improving the accuracy of acquiring a facial image by means of voice.

Figure 4:
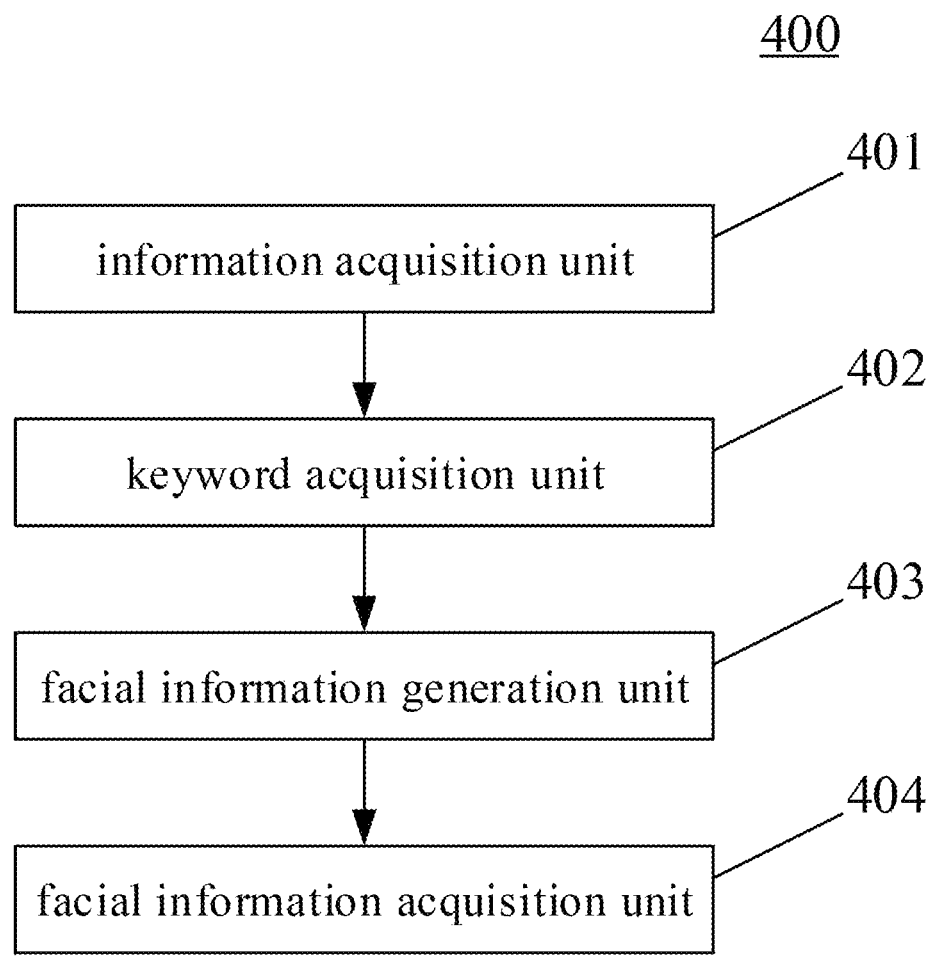
FIG. 4 is a structural diagram of an embodiment of a page control apparatus according to the present disclosure.

Referring further to FIG. 4, as an implementation of the method as shown in each figure, the present disclosure provides an embodiment of a facial information acquisition apparatus, the apparatus embodiment corresponds to the method embodiment as shown in FIG. 2, and the apparatus may specifically be applied in a variety of electronic equipment.

As shown in FIG. 4, a facial information acquisition apparatus 400 according to the present embodiment may comprise an information acquisition unit 401, a keyword acquisition unit 402, a facial information generation unit 403 and a facial information acquisition unit 404. The information acquisition unit 401 is configured for acquiring to-be-processed voice information and a to-be-processed image, and performing voice recognition on the to-be-processed voice information to acquire query information, the to-be-processed image comprising a plurality of facial images, and the query information being used to instruct querying facial information of a specified facial image in the to-be-processed image; the keyword acquisition unit 402 is configured for recognizing semantically the query information to acquire a keyword set for querying the facial information; the facial information generation unit 403 is configured for processing the to-be-processed image to acquire facial information in the to-be-processed image; and the facial information acquisition unit 404 is configured for acquiring facial information corresponding to the to-be-processed voice information from the facial information by using the keyword set.

In some optional implementations of the present embodiment, the keyword acquisition unit 402 may comprise: a phrase set acquisition subunit (not shown in the figure) and a keyword acquisition subunit (not shown in the figure). The phrase set acquisition subunit is configured for semantically recognizing the query information to acquire semantically recognized information, and dividing the semantically recognized information into phrases to acquire a phrase set comprising at least one phrase; and the keyword acquisition subunit is configured for selecting at least one keyword from the phrase set for determining a facial image in the to-be-processed image, and combining the at least one keyword into a keyword set, the keyword including a position keyword.

In some optional implementations of the present embodiment, the facial information generation unit 403 may comprise: a facial recognition subunit (not shown in the figure) and a facial information generation subunit (not shown in the figure). The facial recognition subunit is configured for performing facial recognition on the to-be-processed image, and determining each facial image in the to-be-processed image; and the facial information generation subunit is configured for querying personal information corresponding to the each facial image, and assigning the personal information as facial information corresponding to the facial image, the personal information comprising a name and a gender.

In some optional implementation of the present embodiment, the facial information generation unit 403 is further configured for: scanning the to-be-processed image to acquire coordinate information of the each facial image in the to-be-processed image.

In some optional implementation of the present embodiment, the facial information acquisition unit 404 may comprise: a position information setting subunit (not shown in the figure), a target position information determination subunit (not shown in the figure) and a facial information acquisition subunit (not shown in the figure). The position information setting subunit is configured for setting position information of each facial image in the to-be-processed image according to the coordinate information of the each facial image; the target position information determination subunit is configured for determining target position information of a facial image corresponding to the query information in the to-be-processed image through a keyword in the keyword set; and the facial information acquisition subunit is configured for assigning the facial image corresponding to the target position information as a target facial image corresponding to the to-be-processed voice image, and acquiring facial information of the target facial image.

In some optional implementations of the present embodiment, the position information setting subunit may comprise: a grid generation module (not shown in the figure) and a position information setting module (not shown in the figure). The grid generation module is configured for dividing the to-be-processed image into a grid having m rows and n columns according to the coordinate information of each facial image, the facial image in each element of the grid being not more than one; and the position information setting module is configured for setting a row number and/or a column number of each element of the grid where the each facial image is as position information of the facial image.

In some optional implementations of the present embodiment, the facial information acquisition apparatus 400 may further comprise: a display unit (not shown in the figure), configured for displaying the target facial image, and the display unit may comprise: a position information display subunit (not shown in the figure) and a target facial image display subunit (not shown in the figure). The position information display subunit is configured for displaying, in the each facial image in the to-be-processed image position, information corresponding to the each facial image; and the target facial image display subunit is configured for highlighting, in response to selection information of a user selecting position information of the target facial image, the target facial image corresponding to the position information as indicated by the selection information in the to-be-processed image.

In some optional implementations of the present embodiment, the facial information acquisition apparatus 400 may further comprise: a unit configured for displaying and/or playing, in response to determination information of the user determining the target facial image, facial information of the target facial image as indicated by the determination information.

The present embodiment further provides a server, comprising: one or more processors; and a storage, configured for storing one or more programs, the one or more programs, when executed by the one or more processors, cause the one or more processors to execute the facial information acquisition method above.

The present embodiment further provides a computer readable storage medium storing a computer program, the program, when executed by a processor, causes the processor to perform the facial information acquisition method above.

Figure 5:
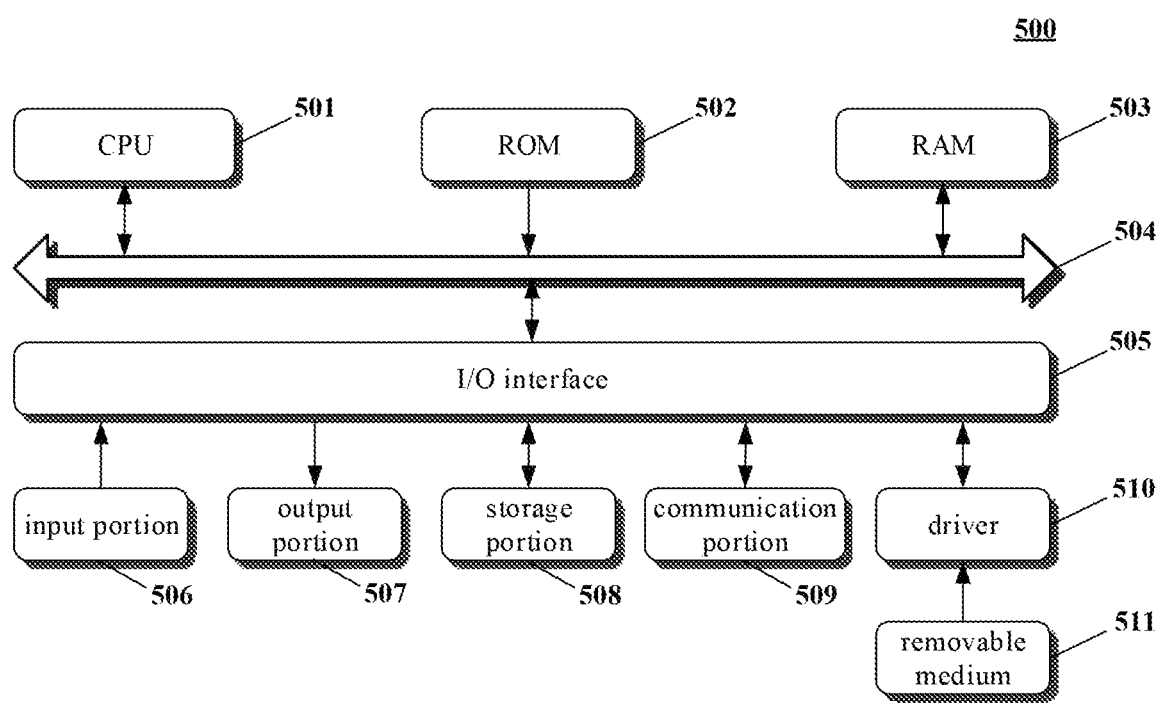
FIG. 5 is structural diagram of a computer system for realizing a server according to an embodiment of the present disclosure.

Reference is made to FIG. 5 that shows a schematic structural diagram of a computer system 500 suitable for implementing a server according to an embodiment of the present disclosure. The server shown in FIG. 5 is merely an example, and shall not impose any limitation on the function and the scope of use of the present embodiment of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an information acquisition unit, a keyword acquisition unit, a facial information generation unit and a facial information acquisition unit, where the names of these units or modules do not in some cases constitute a limitation to such units or modules themselves. For example, the facial information acquisition unit may also be described as "a unit for acquiring facial information."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire to-be-processed voice information and a to-be-processed image, and perform voice recognition on the to-be-processed voice information to acquire query information, the to-be-processed image comprising a plurality of facial images, and the query information being used to instruct querying facial information of a specified facial image in the to-be-processed image; recognize semantically the query information to acquire a keyword set for querying the facial information; process the to-be-processed image to acquire facial information in the to-be-processed image; and acquire facial information corresponding to the to-be-processed voice information from the facial information by using the keyword set The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for acquiring facial information, the method comprising:
    acquiring to-be-processed voice information and a to-be-processed image, and performing voice recognition on the to-be-processed voice information to acquire query information, the to-be-processed image comprising a plurality of facial images, and the query information acquired from the to-be-processed voice information being used to instruct querying facial information of a specified facial image in the to-be-processed image;
    recognizing semantically the query information to acquire a keyword set for specifying the specified facial image in the to-be-processed image;
    performing facial recognition on the to-be-processed image, and determining each facial image in the to-be-processed image;
    scanning the to-be-processed image to acquire coordinate information of the each facial image in the to-be-processed image;
    setting position information of each facial image in the to-be-processed image according to the coordinate information of the each facial image, comprising:
        dividing the to-be-processed image into grids of m rows and n columns according to the coordinate information of each facial image, a number of the facial image in each grid being not more than one; and
        setting a row number and/or a column number of a grid where the each facial image is located as position information of the facial image;
    determining target position information of a facial image corresponding to the query information in the to-be-processed image through a keyword in the keyword set; and
    assigning the facial image corresponding to the target position information as a target facial image corresponding to the to-be-processed voice image, and acquiring facial information of the target facial image.

2. The method according to claim 1, wherein the recognizing semantically the query information to acquire a keyword set for querying the facial information comprises:
    semantically recognizing the query information to acquire semantically recognized information, and dividing the semantically recognized information into phrases to acquire a phrase set comprising at least one phrase; and
    selecting at least one keyword from the phrase set for determining a facial image in the to-be-processed image, and combining the at least one keyword into a keyword set, the keyword including a position keyword.

3. The method according to claim 1, wherein the method further comprises:
    querying personal information corresponding to the each facial image, and assigning the personal information as facial information corresponding to the facial image, the personal information comprising a name and a gender.

4. The method according to claim 1, further comprising:
displaying the target facial image, the displaying the target facial image comprising:
   displaying, in the each facial image in the to-be-processed image position, information corresponding to the each facial image; and
   highlighting, in response to selection information of a user selecting position information of the target facial image, the target facial image corresponding to the position information as indicated by the selection information in the to-be-processed image.

5. The method according to claim 4, further comprising:
displaying and/or playing, in response to determination information of the user determining the target facial image, facial information of the target facial image as indicated by the determination information.

6. An apparatus for acquiring facial information, the apparatus comprising:
   at least one processor; and
   a memory storing instructions, which when executed by the at least one processor, cause the at least one processor to perform operations, the operations comprising:
      acquiring to-be-processed voice information and a to-be-processed image, and performing voice recognition on the to-be-processed voice information to acquire query information, the to-be-processed image comprising a plurality of facial images, and the query information acquired from the to-be-processed voice information being used to instruct querying facial information of a specified facial image in the to-be-processed image;
      recognizing semantically the query information to acquire a keyword set for specifying the specified facial image in the to-be-processed image;
      performing facial recognition on the to-be-processed image, and determining each facial image in the to-be-processed image;
      scanning the to-be-processed image to acquire facial coordinate information of the each facial image in the to-be-processed image;
      setting position information of each facial image in the to-be-processed image according to the coordinate information of the each facial image, comprising:
         dividing the to-be-processed image into grids of m rows and n columns according to the coordinate information of each facial image, a number of the facial image in each grid being not more than one; and
         setting a row number and/or a column number of a grid where the each facial image is located as position information of the facial image;
      determining target position information of a facial image corresponding to the query information in the to-be-processed image through a keyword in the keyword set; and
      assigning the facial image corresponding to the target position information as a target facial image.

7. The apparatus according to claim 6, wherein the recognizing semantically the query information to acquire a keyword set for querying the facial information comprises:
   semantically recognizing the query information to acquire semantically recognized information, and dividing the semantically recognized information into phrases to acquire a phrase set comprising at least one phrase; and
   selecting at least one keyword from the phrase set for determining a facial image in the to-be-processed image, and combining the at least one keyword into a keyword set, the keyword including a position keyword.

8. The apparatus according to claim 6, wherein the operations further comprise:
   querying personal information corresponding to the each facial image, and assigning the personal information as facial information corresponding to the facial image, the personal information comprising a name and a gender.

9. The apparatus according to claim 6, further comprising:
displaying the target facial image, the displaying the target facial image comprising:
   displaying, in the each facial image in the to-be-processed image position, information corresponding to the each facial image; and
   highlighting, in response to selection information of a user selecting position information of the target facial image, the target facial image corresponding to the position information as indicated by the selection information in the to-be-processed image.

10. The apparatus according to claim 9, further comprising:
   displaying and/or playing, in response to determination information of the user determining the target facial image, facial information of the target facial image as indicated by the determination information.

11. A computer readable storage medium storing a computer program, wherein the program, when executed by a processor, causes the processor to perform the method according to claim 1.

* * * * *